(12) United States Patent
Wilkins et al.

(10) Patent No.: US 9,340,357 B2
(45) Date of Patent: May 17, 2016

(54) ACCUMULATION CONVEYOR WITH PIEZOELECTRIC ACTIVATION

(71) Applicant: Intelligrated Headquarters, LLC, Mason, OH (US)

(72) Inventors: John J. Wilkins, Erlanger, KY (US); Kevin Lawrence Klueber, Indian Springs, OH (US); Kenneth S. Wales, Mason, OH (US)

(*) Notice: Subject to any disclaimer, the term of this patent is extended or adjusted under 35 U.S.C. 154(b) by 0 days.

(21) Appl. No.: 14/295,617

(22) Filed: Jun. 4, 2014

(65) Prior Publication Data

US 2014/0360844 A1    Dec. 11, 2014

Related U.S. Application Data

(60) Provisional application No. 61/831,299, filed on Jun. 5, 2013.

(51) Int. Cl.
*B65G 13/071* (2006.01)
*B65G 13/07* (2006.01)

(52) U.S. Cl.
CPC .............. *B65G 13/071* (2013.01); *B65G 13/07* (2013.01)

(58) Field of Classification Search
CPC ...... B65G 13/07; B65G 13/071; B65G 13/12; B65G 23/14
USPC .................... 198/781.03, 781.09, 781.1, 790, 198/370.13, 371.3, 690.1, 459.8
See application file for complete search history.

(56) References Cited

U.S. PATENT DOCUMENTS

| | | | |
|---|---|---|---|
| 4,088,224 A * | 5/1978 | Kittredge | B65G 13/07 198/783 |
| 5,217,105 A | 6/1993 | Sapp et al. | |
| 6,478,142 B2 * | 11/2002 | Cotter | B65G 47/261 198/781.09 |
| 6,615,972 B2 | 9/2003 | Veit et al. | |
| 6,889,822 B1 | 5/2005 | Wagner et al. | |
| 6,951,274 B2 | 10/2005 | Zeitler et al. | |
| 7,441,646 B2 | 10/2008 | Heit et al. | |
| 7,516,835 B2 | 4/2009 | Neiser et al. | |
| 7,604,110 B2 | 10/2009 | Deur | |
| 7,841,461 B2 * | 11/2010 | Nguyen | B65G 21/14 198/781.03 |
| 7,857,116 B2 | 12/2010 | Heit et al. | |
| 8,408,384 B2 * | 4/2013 | Rogers | B65G 47/54 193/35 A |
| 8,604,670 B2 | 12/2013 | Mahameed et al. | |
| 8,754,571 B2 | 6/2014 | Pyadkin | |
| 2006/0076216 A1 * | 4/2006 | Wagner | B65G 47/261 198/790 |
| 2006/0249355 A1 | 11/2006 | Costanzo et al. | |
| 2012/0038245 A1 * | 2/2012 | Moler | H02N 2/06 310/317 |
| 2012/0312663 A1 | 12/2012 | Schmidt et al. | |

(Continued)

OTHER PUBLICATIONS

International Search Report and Written Opinion dated Sep. 24, 2014 for Application No. PCT/US2014/040831.

(Continued)

*Primary Examiner* — Leslie A Nicholson, III
*Assistant Examiner* — Keith R Campbell

(57) ABSTRACT

An accumulation conveyor for transporting articles includes a plurality of rollers defining a conveying surface, a frame supporting the plurality of rollers, a drive belt selectively couplable with the plurality of rollers to drive the plurality of rollers, and an actuator assembly having at least one piezoelectric actuator assembly configured to selectively urge the drive belt into driving engagement with the plurality of rollers.

15 Claims, 9 Drawing Sheets

(56) References Cited

U.S. PATENT DOCUMENTS

| | | | |
|---|---|---|---|
| 2013/0160570 A1* | 6/2013 | Ayanji | G01L 5/0038 73/862.381 |
| 2014/0224622 A1* | 8/2014 | German | B65G 13/07 198/790 |

OTHER PUBLICATIONS

International Search Report and Written Opinion dated Sep. 24, 2014 for Application No. PCT/US2014/040843.

* cited by examiner

ACCUMULATION CONVEYOR WITH PIEZOELECTRIC ACTIVATION

PRIORITY

This application claims priority to U.S. Provisional Patent Application Ser. No. 61/831,299, filed Jun. 5, 2013, entitled "Accumulation Conveyor With Piezoelectric Activation," the entire contents of which are incorporated by reference herein.

BACKGROUND

Accumulation conveyors are components of high volume distribution and fulfillment systems. Accumulation conveyors have an upper conveying surface configured to convey, receive, and/or accumulate articles, such as cartons, into a line of stopped articles. Accumulation conveyors can hold selected articles for shipping until a truck is positioned to receive the load, and then release the selected articles. Accumulation conveyors can also convert the line of stopped articles into moving discreet groups of articles for passage onto a moving conveyor system. In some configurations, a moving belt is located below the upper conveying surface and is driven into engagement with the upper conveying surface when it is desired to move articles.

This disclosure relates to accumulation conveyors, and is specifically directed to a piezoelectric actuator assembly for urging the drive belt into engagement with the upper conveying surface so as to control the movement of articles located on the upper conveying surface.

BRIEF DESCRIPTION OF THE DRAWINGS

The accompanying drawings, which are incorporated herein and constitute part of this specification, illustrate exemplary embodiments of the invention, and, together with the general description given above, and the detailed description given below, serve to explain the principles of the present invention.

DETAILED DESCRIPTION

Figure 1:
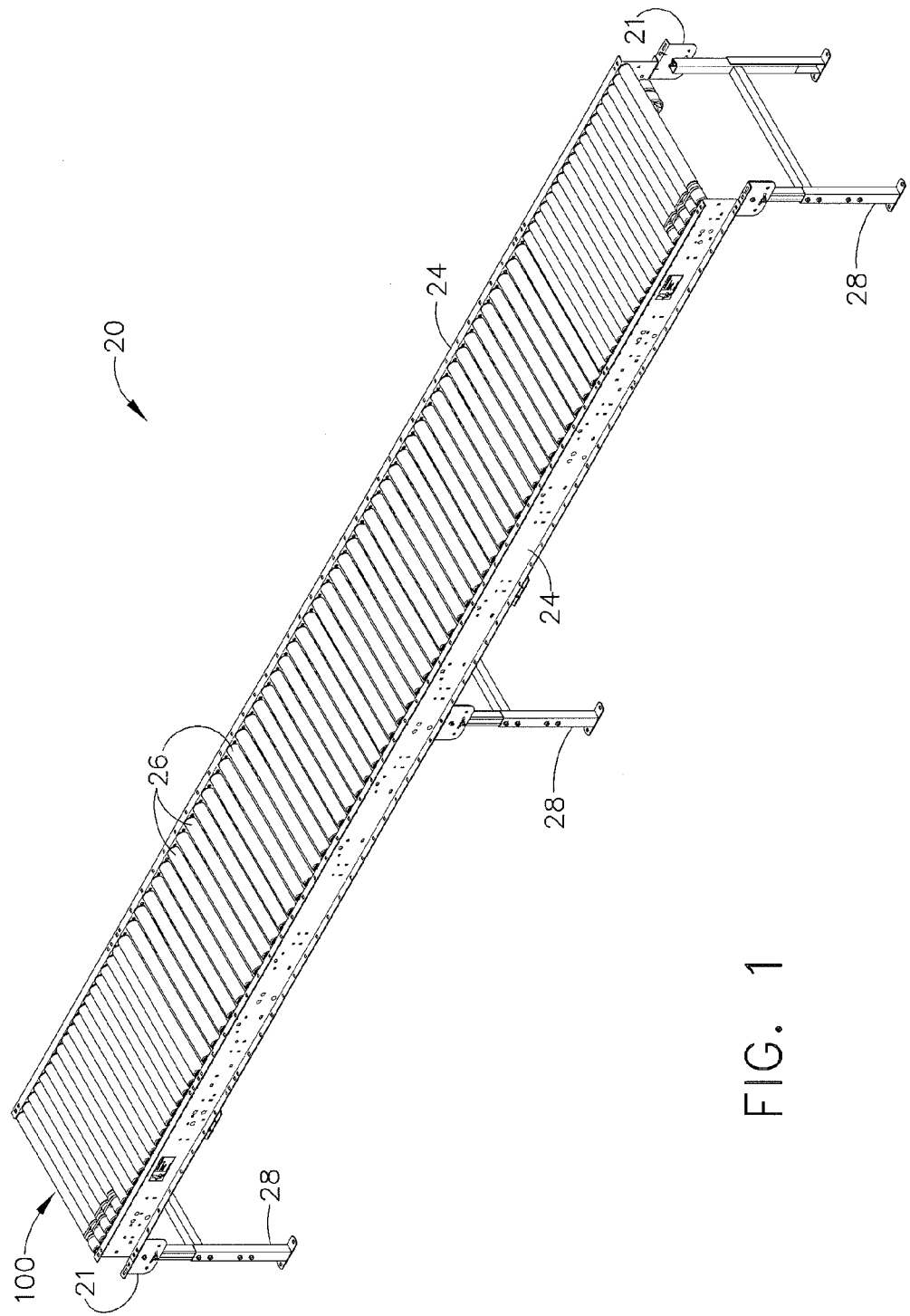
FIG. 1 is a top perspective view of an accumulation conveyor having conveying rollers.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

An accumulation conveyor, configured to transport articles, has a plurality of rollers, that define a conveying surface, with the rollers being supported by and rotatable relative to a frame. The rollers are drivable by a drive belt which is selectively coupable with the rollers. The conveyor includes an actuator assembly which is configured to selectively urge the drive belt into driving engagement with the rollers. The actuator assembly comprises at least one piezoelectric actuator.

The word "exemplary" is used herein to mean "serving as an example, instance, or illustration." Any implementation described herein as "exemplary" is not necessarily to be construed as preferred or advantageous over other implementations.

Referring now to the drawings in detail, FIG. 1 is a perspective view of accumulation conveyor 20. Accumulation conveyor 20 comprises two spaced apart frame members or sides 24 that support a plurality of conveyor rollers 26 extending transversely between sides 24. Sides 24 can be supported by legs 28. Conveyor rollers 26 are supported at each end by a hex shaped axle (not shown), each of which engages a complimentary shaped opening formed in frame sides 24. Accordingly, conveyor rollers 26 are rotatably supported by the axle, with the shape of the openings in sides 24 preventing rotation of the axles. Of course other suitable shapes for the axles and the corresponding openings in sides 24 will be apparent to one with ordinary skill in the art in view of the teachings herein. Conveyor rollers 26 thereby define an upper conveying surface 100 on which articles being transported are located. Bracket 21 is positioned at either end of accumulation conveyor 20 to allow a plurality of sections 30 (see FIG. 2) to be secured together to form accumulation conveyor 20. Further examples of accumulation conveyors are disclosed in U.S. Pat. No. 6,889,822 and U.S. Pat. Pub. No. 2006/0076216, which are incorporated by reference herein in their entirety.

Figure 2:
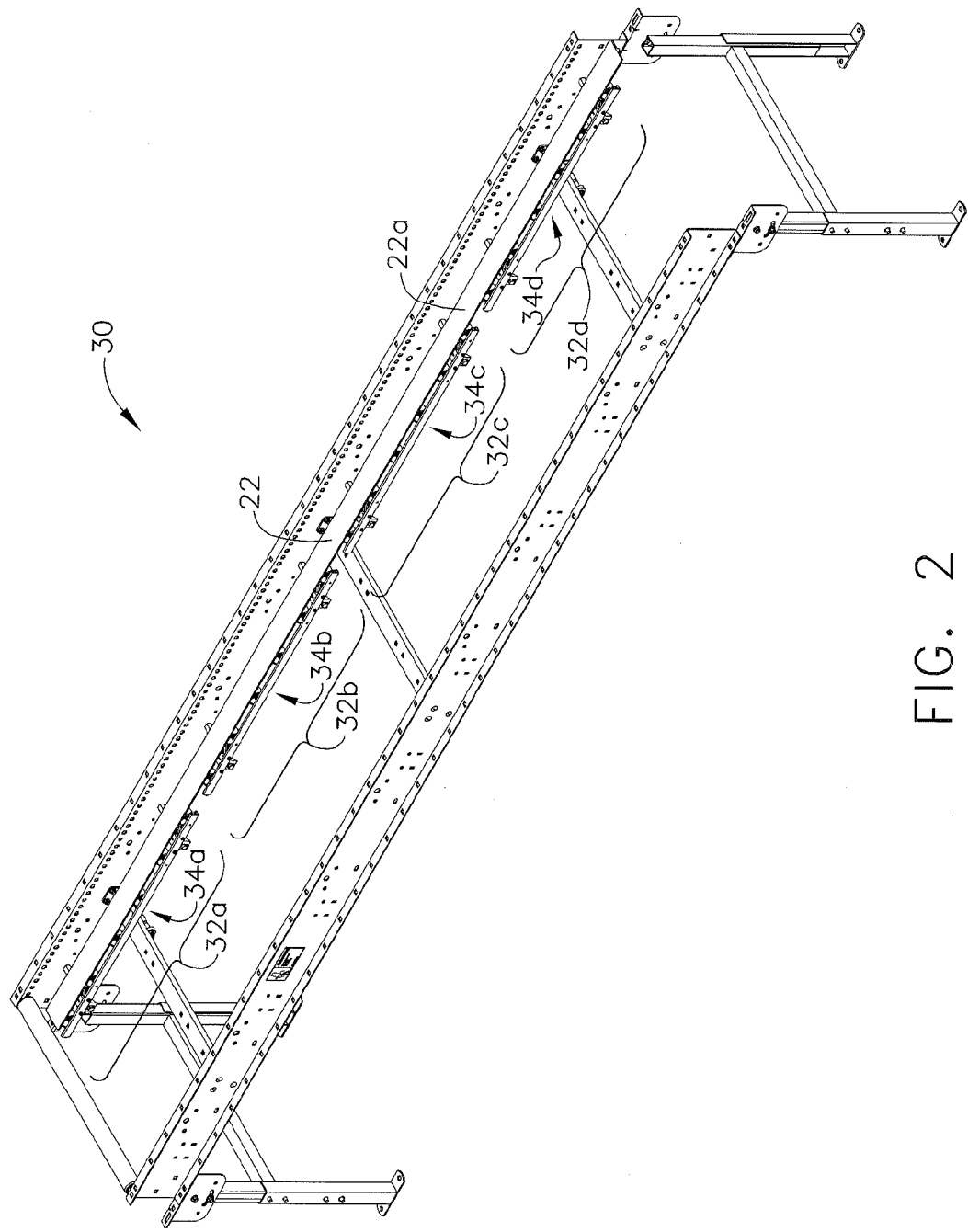
FIG. 2 is a top perspective view of an individual section of the accumulation conveyor shown in FIG. 1, with all but one conveying roller removed.

FIG. 2 shows section 30 of accumulation conveyor 20 with conveyor rollers 26 removed for clarity. Accumulation conveyor section 30 comprises a plurality of individually controllable zones 32, identified in FIG. 2 as individual zones 32a, 32b, and 32c. Each zone 32 is defined by a respective actuator assembly 34, identified in FIGS. 2 as 34a, 34b, and 34c, each of which is controllable independent of the other actuator assemblies. FIG. 2 shows section 30 including a portion of drive belt 22. Drive belt 22 is a single, endless belt within the portion of accumulation conveyor 20 driven by a power source (not shown), which drives zones 32 of accumulation conveyor 20. Drive belt 22 includes upper run 22a that is urged into driving contact with the lower tangent edge of conveyor rollers 26 in a selected zone 32 upon actuation of that zone 32. Drive belt 22 further comprises a lower run (not shown), which is the return portion of drive belt 22. Although the length of zones 32 may vary, in the embodiment depicted, each zone 32a-d is about 36 inches long. Additional accumulation conveyor sections may be attached to either end of accumulation conveyor section 30 to form a single power source, single drive belt accumulation conveyor 20 having the desired overall length and number of controlled zones.

Figure 3:
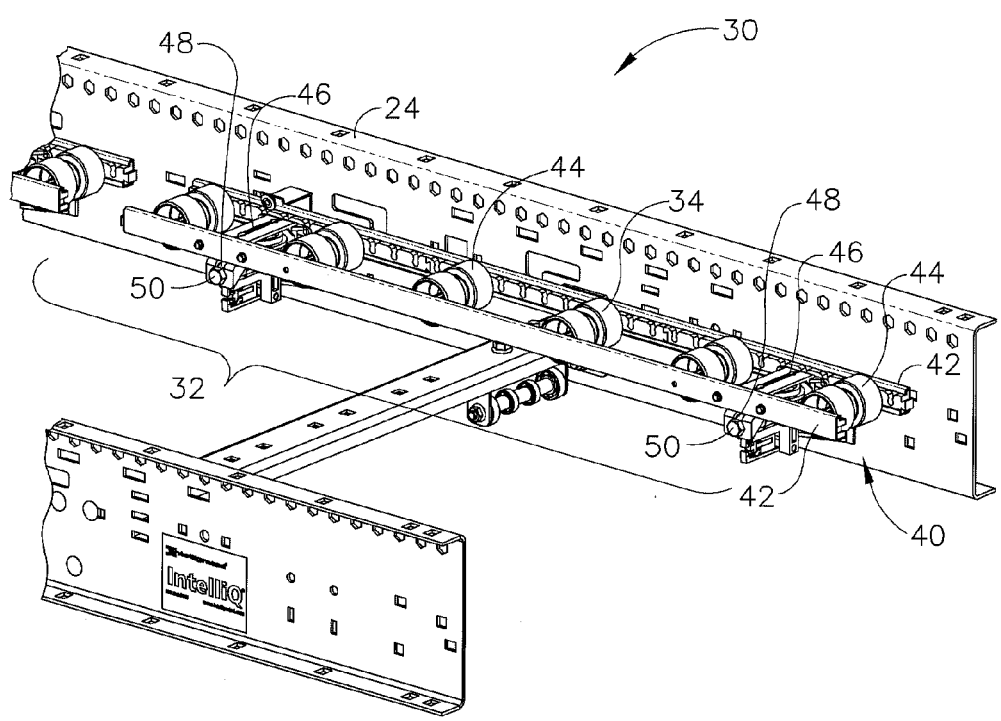
FIG. 3 is a top perspective view of an individual zone of the individual section shown in FIG. 2, showing an actuation assembly with the drive belt omitted.
Figure 4:
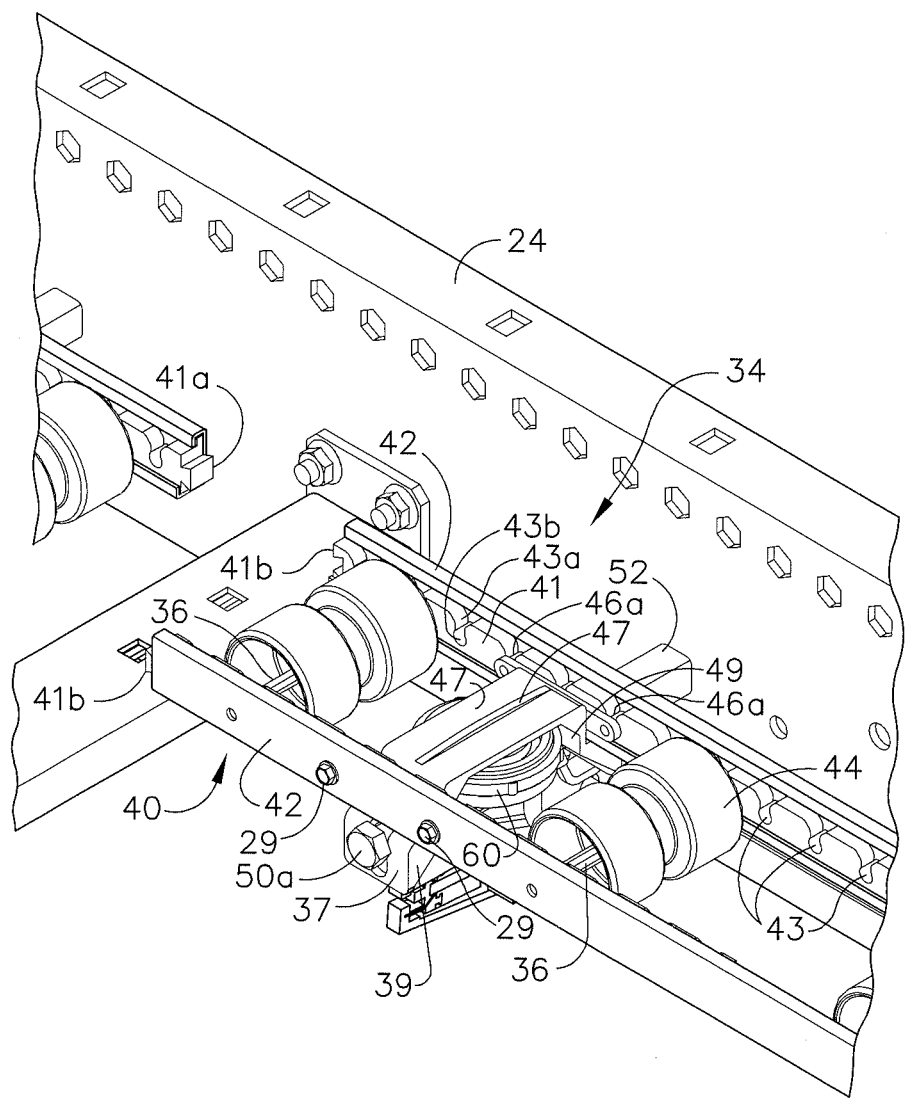
FIG. 4 is an enlarged top perspective view of one end of the actuation assembly shown in FIG. 3.

Actuator assemblies 34a, 34b, 34c and 34d are selectively and independently activated to urge drive belt 22 upward into driving contact with conveyor rollers 26 in the respective corresponding zone 32a, 32b, and 32c to drive conveyor rollers 26 and transport articles in the selected zone 32a, 32b, 32c, 32d. An individual actuator assembly 34 is shown in more detail in FIGS. 3 and 4. As depicted, actuator assembly 34 includes accumulator shoe assembly 40 supported by two or more shoe support brackets 52 extending from frame side 24. Each accumulator shoe assembly 40 includes a frame which is depicted as two spaced apart shoe frame members 42, which carry respective axle retainers 41. In the depicted embodiment, frame members 42 are made of aluminum, although any sufficiently rigid material may be used. Each axle retainer 41 includes a plurality of uniformly spaced axle receiving slots 43. Accumulator shoe assembly 40 further includes a plurality of spaced apart pressure rollers 44, rotatably supported by respective pressure roller axles 36. Pressure roller axles 36 are received by axle receiving slots 43, having entrance 43a that leads to a larger opening 43b shaped complementary to the ends of pressure roller axles 36. In the present embodiment, pressure roller axles 36 do not rotate. In other versions, pressure roller axles 36 can rotate.

In the depicted embodiment, axle receiving slots 43 have the same spacing as the openings in frame sides 24 that receive conveyor roller 26 axles, and are aligned therewith. The plurality of axle receiving slots 43 provides a modular, adjustable accumulation shoe that can easily be fit to the desired configuration. For example, with conveyor rollers 26 disposed on three inch centers, pressure rollers 44 are disposed in-between respective pairs of conveyor rollers 26, one inch off center from one of the two conveyor rollers 26 and two inches off center from the other. If conveyor rollers 26 are disposed on two inch centers, pressure rollers 44 are disposed one inch off center of each of the pair of conveyor rollers 26. In the depicted embodiment, one pressure roller assembly is used for each pair of conveyor rollers 26.

Shoe frame members 42 are supported in their spaced apart, generally parallel relationship by two spaced apart members 46, also known as a shoe spreader. Shoe spreader 46 includes two pairs of spaced apart extensions 46a that extend in opposing directions and engage a respective axle receiving slot 43, as seen best in FIGS. 4 and 5. Shoe frame members 42 are secured to shoe spreader 46 by self taping screws 29 that are threaded into extension 46a. Of course, any appropriate fastening and support structure may be used.

Figure 5:
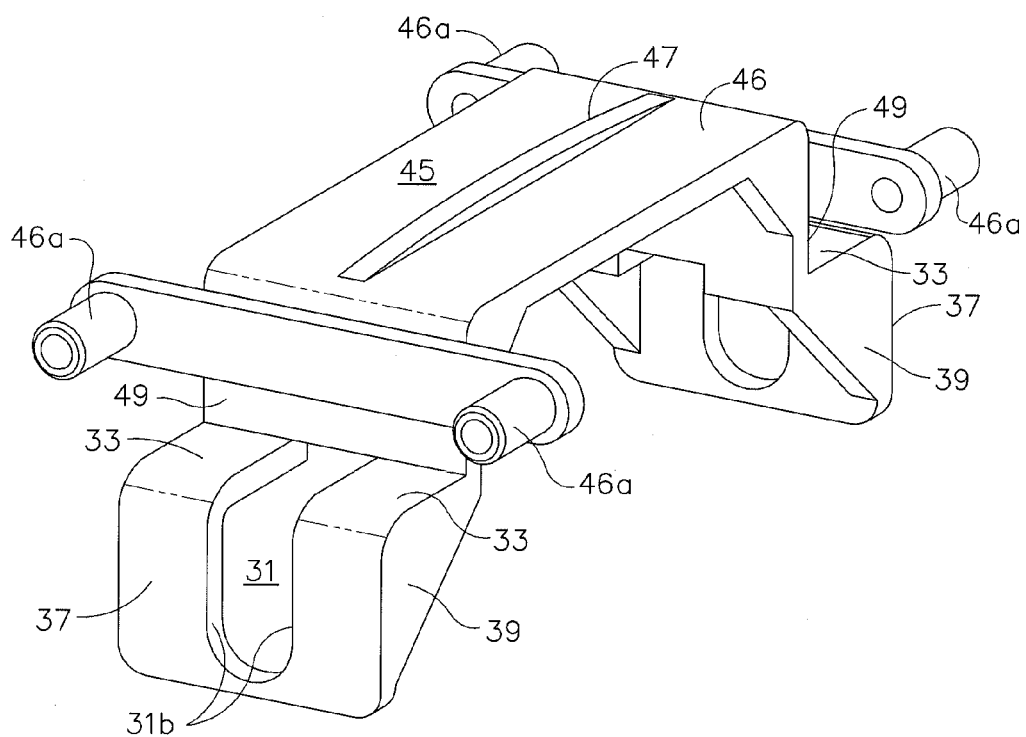
FIG. 5 is a top perspective view of a shoe spreader of the actuation assembly shown in FIG. 3.

FIG. 5 shows shoe spreader 46 having central web member 45 from which respective vertical walls 49 depend. Each vertical wall 49 is connected to a respective horizontally extending wall 33 that terminates in a downwardly extending vertical guide portion 37. Gussets 39 provide structural rigidity between horizontal wall 33 and guide portion 37. Horizontal extending wall 33 and guide portion 37 includes a guide slot or track 31. Guide pin 50 includes head 50a that functions to locate and retain one of vertical guide portions 37. Shoe support bracket 52 includes a retention surface that functions to locate and retain the other of the vertical guide portions 37. The retention surface is also engaged by shoulder 50b of guide pin 50, which functions to secure shoe support bracket 52 to frame side 24. Vertical portion 31b of guide track 31 guides shoe spreader 46 during vertical movement relative to guide pin 50.

Figure 6:
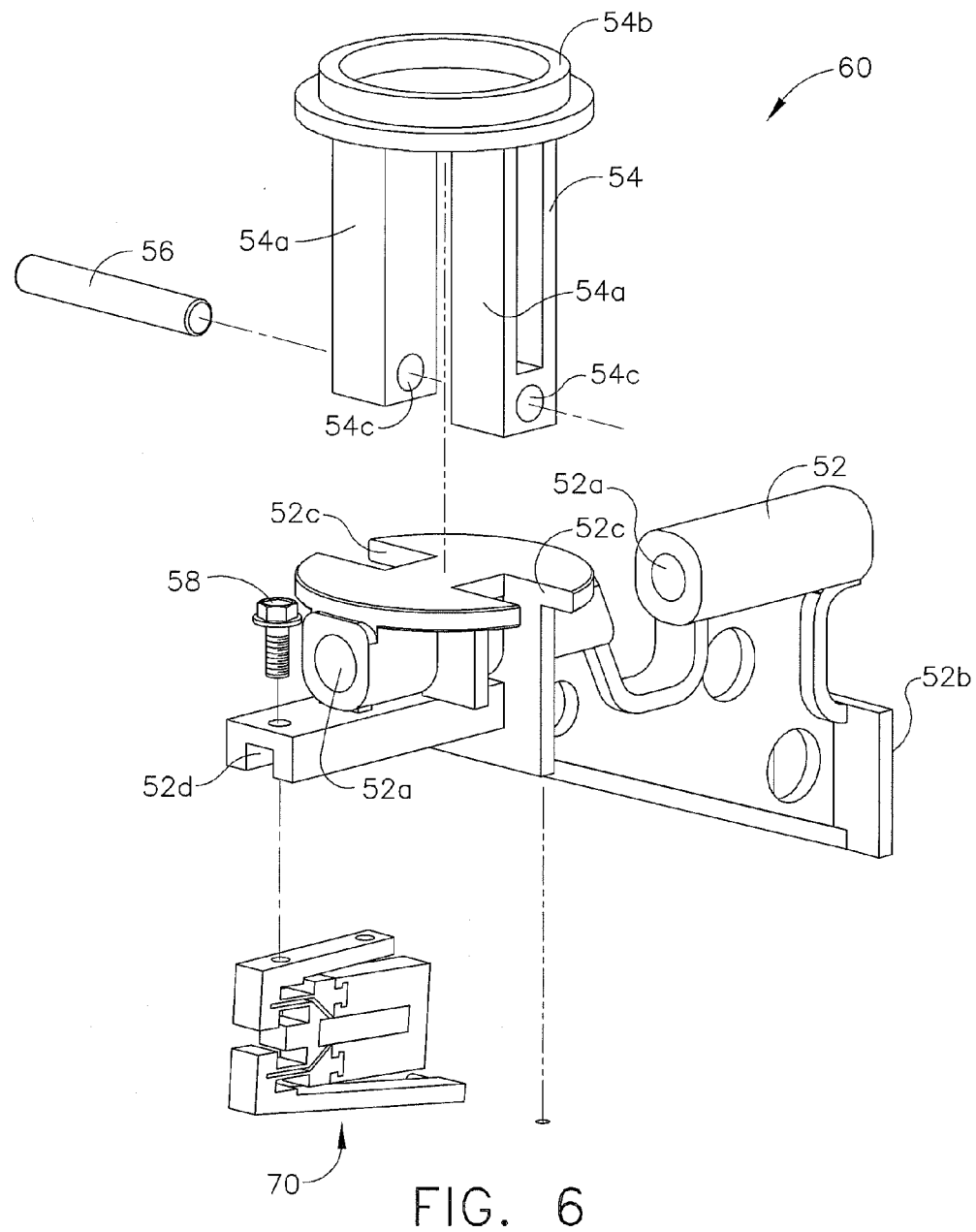
FIG. 6 is an exploded view of a piezoelectric lift assembly of the actuator assembly shown in FIG. 3.

Referring to FIG. 6, each actuator assembly 34 includes a pair of spaced apart piezoelectric lift assemblies 60 that attach to and extend inward from one of frame sides 24 to engage with accumulator shoe assembly 40. Piezoelectric lift assemblies 60 are configured to raise accumulator shoe assembly 40 relative to sides 24 when electrically energized, and lower accumulator shoe assembly 40 when de-energized. This raising and lowering action is used to engage and/or disengage one of the individually controllable zones 32 with drive belt 22. In the depicted embodiment, in the non-actuated position, the upper surface of drive belt 22 is about three sixteenths of an inch from the lower surface of conveyor rollers 26, minimizing the necessary travel of piezoelectric lift assemblies 60. It may be desirable to use piezoelectric lift assembly 60 to actuate accumulator shoe assembly 40 instead of a fluid driven actuator, which may have fluid friction losses over long distances and require expensive auxiliary equipment, such as pumps and tubing, that are noisy and can have high power consumption.

As shown in FIG. 6, each piezoelectric lift assembly 60 comprises shoe support bracket 52, lift member 54, and piezoelectric actuator 70. Shoe support bracket 52 comprises bore 52a configured to receive guide pin 50 therethrough. Shoe support bracket 52 further comprises support hook 52b coupled with frame side 24 of accumulation conveyor 20 to prevent rotation of shoe support bracket 52 about guide pin 50. Shoe support bracket 52 defines a pair of guides 52c on opposing sides of shoe support bracket 52 that are configured to receive and guide lift member 54. Accordingly, lift member 54 comprises a pair of guide arms 54a that extend outwardly from lift member 54 that are configured to slide relative to support bracket 52 within guides 52c. Guide arms 54a define holes 54c to receive and secure lift pin 56 therein. Lift member 54 further comprises lift feature 54b coupled to guide arms 54a to contact and engage a bottom surface of central web member 45. Shoe support bracket 52 further defines slot 52d to receive piezoelectric actuator 70 within slot 52d. Piezoelectric actuator 70 is secured to shoe support bracket 52 by at least one screw 58, although other suitable methods for securing piezoelectric actuator 70 with shoe support bracket 52 will be apparent to one with ordinary skill in the art in view of the teachings herein.

Figure 7:
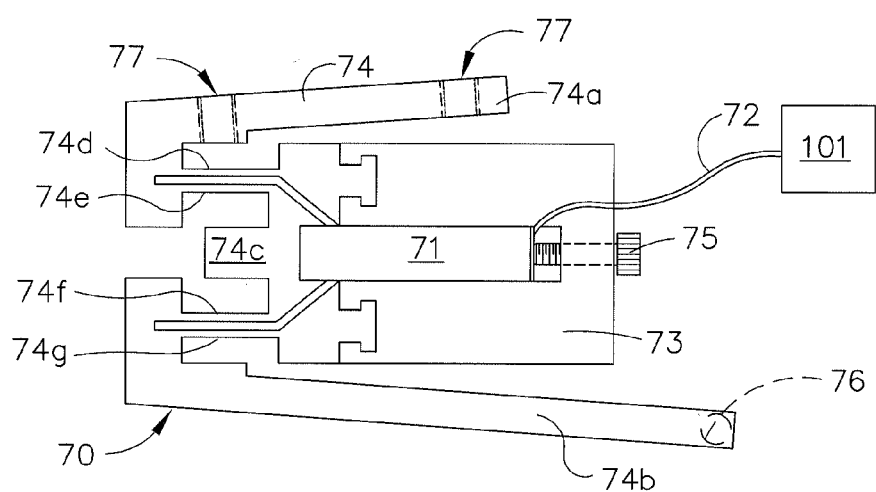
FIG. 7 is a top perspective view of a piezoelectric actuator of the piezoelectric lift assembly shown in FIG. 6 in an un-actuated position.
Figure 8:
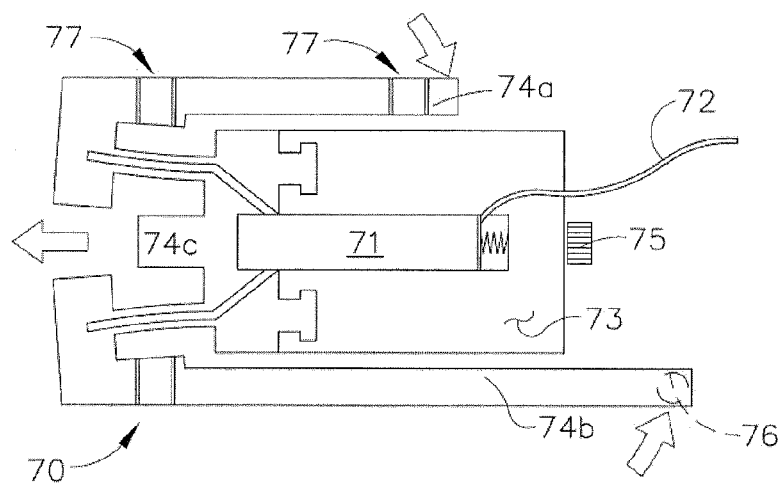
FIG. 8 is a top perspective view of the piezoelectric actuator of the piezoelectric lift assembly shown in FIG. 6 in an actuated position.

FIGS. 7-8 show piezoelectric actuator in more detail. Piezoelectric actuator 70 can be a ViVa actuator, as commercially available from Parker Hannifin Corporation, 6035 Parkland Blvd., Cleveland Ohio, 44124. Piezoelectric actuator 70 comprises first frame 73 that interlocks with second frame 74 to house piezoelectric element 71 comprising a piezoelectric material. Piezoelectric materials exhibit the piezoelectric effect to change shape (mechanical strain) when subjected to an electrical charge. For the present embodiment, the piezoelectric material can be lead titanate, but other suitable materials can be used. For example, other well-known piezoelectric materials can include crystals such as Langasite (quartz) or gallium orthophosphate, ceramics such as barium titanate or bismuth ferrite, and plastic materials such as polyvinylidine fluoride. The physical shape change can produce a small displacement with a high output force. Piezoelectric element 71 is held at the ends between first frame 73 and second frame 74 such that one end is compressed against second frame 74 with a pretension screw 75 that extends through first frame 73 to contact a second end of piezoelectric element 71. Pretension screw 75 can be adjusted to remove clearances between parts, and to provide a desired pre-compression to piezoelectric element 71.

Wires 72 are provided to conduct an electrical charge to piezoelectric element 71 to induce the shape change (mechanical strain) in piezoelectric element 71 and move piezoelectric actuator 70 from the un-actuated shape shown in FIG. 7 to an actuated shape shown in FIG. 8. When an electrical charge is applied to piezoelectric element 71, it changes shape and moves central tang 74c of second frame 74 linearly to cause beams 74d, 74e, 74f and 74g to flex as shown. This linear motion can be amplified or multiplied with the interaction between first frame 73 and second frame 74 to produce a rotational or arcuate inward movement of both mounting frame arm 74a and output frame arm 74b (see arcuate arrows). Due to the rectangular shape of piezoelectric element 71, piezoelectric element 71 has the greatest linear change along a longitudinal axis thereof (see arrow at central tang 74c) to provide the greatest mechanical motion at some force output. This greatest mechanical motion (mechanical strain) can be amplified by the shape of actuator 70 to produce a longer length of arcuate motion at the ends of mounting frame arm 74a and output frame arm 74b. Output frame arm 74b extends outwardly from piezoelectric actuator 70. This couples piezoelectric actuator 70 with lift member 54 to thereby translate lift member 54. Piezoelectric actuator 70 further defines mounting holes 77 within mounting frame arm 74a to receive screw 58 to secure piezoelectric actuator 70 with shoe support bracket 52.

Figure 9:
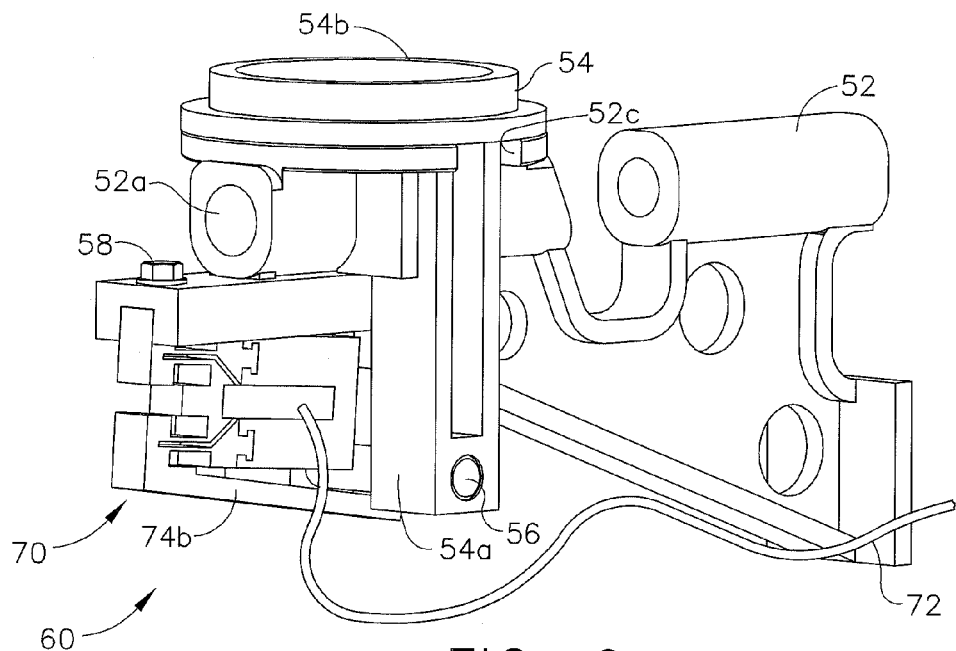
FIG. 9 is an isometric view of an assembled piezoelectric lift assembly of FIG. 6 in an un-activated state.

FIG. 9 shows an assembled view of piezoelectric lift assembly 60 with piezoelectric actuator 70 in the un-actuated position. This places the output frame arm 74b in a lowered position. Guide arms 54a of lift member 54 are slidably received within guides 52c of support bracket 52. In the depicted embodiment, lift pin 56 can rest on top of output frame arm 74b. As shown, guide pin 50 and support hook 52b secure piezoelectric lift assembly 60 to frame side 24 of accumulation conveyor 20 such that actuator assembly 34 is movable relative to guide pin 50. With output frame arm 74b of actuator 70 in the lowered position, lift member 54 and actuator assembly 34 are lowered such that pressure rollers 44 of actuator assembly 34 are not in contact with drive belt 22 such that conveyor rollers 26 are not driven by drive belt 22.

Figure 10:
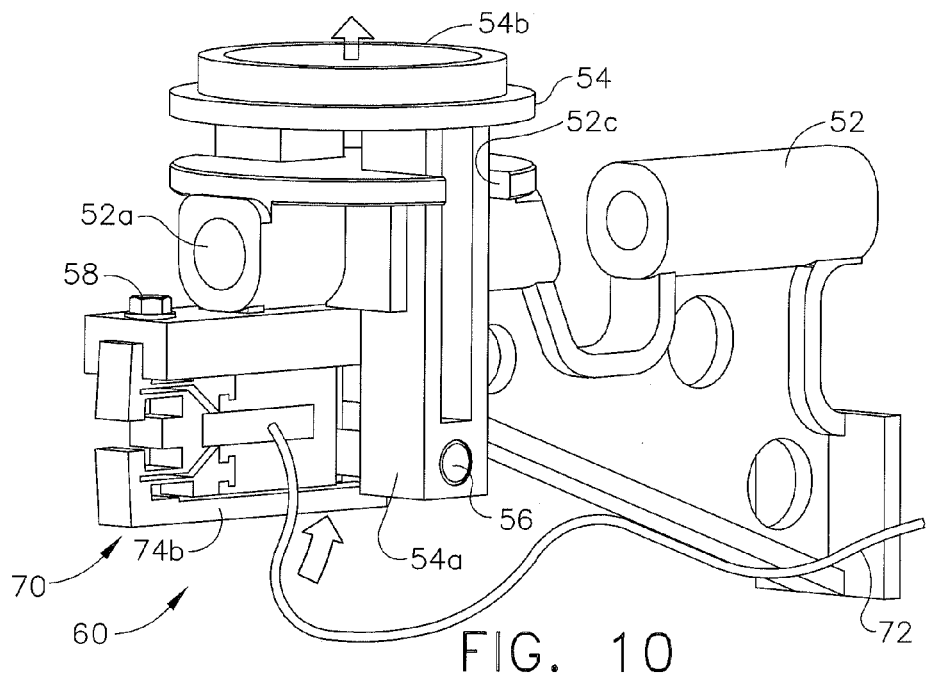
FIG. 10 is an isometric view of the assembled piezoelectric lift assembly of FIG. 6 in an activated state.
Figure 12:
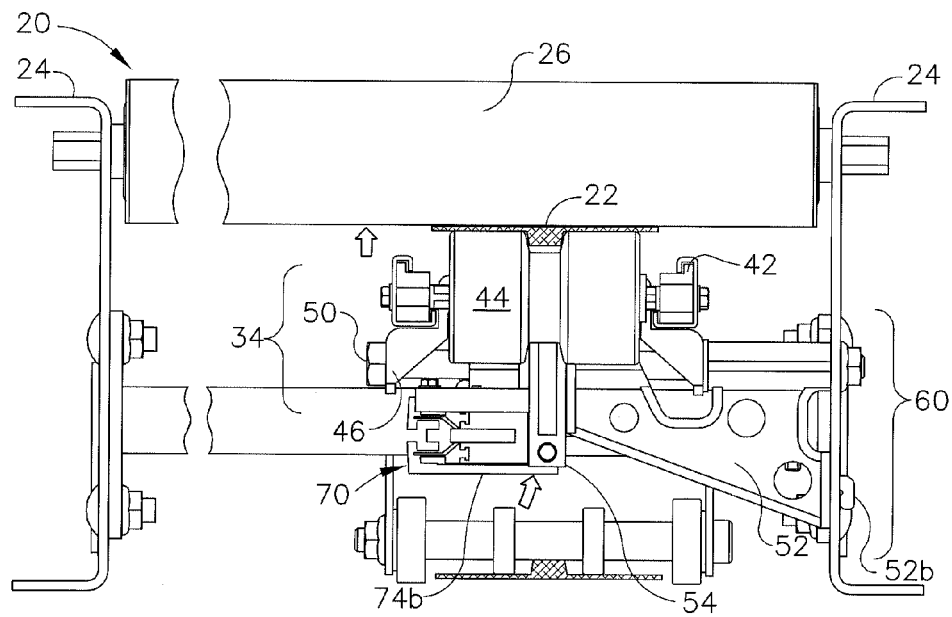
FIG. 12 is an end view of the accumulation conveyor of FIG. 1 with the piezoelectric lift assembly in the actuated position.

FIG. 10 shows the assembled piezoelectric lift assembly 60 with piezoelectric actuator 70 in the actuated state due to the application of electrical energy. The energizing of piezoelectric actuator 70 translates output frame arm 74b in an upwards arcuate path to thereby translate lift pin 56 and lift member 54 upwards relative to support bracket 52. Lift member 54 thereby raises actuator assembly, as shown in FIG. 12. Lift member 54 engages shoe spreader 46 to lift shoe frame members 42 and pressure rollers 44. Pressure rollers 44 thereby engage drive belt 22 to raise drive belt 22 into driving contact with conveyor rollers 26 of individual zone 32. As conveyor rollers 26 rotate, articles on accumulation conveyor 20 are advanced along the moving portion of the upper conveying surface 100. Due to the design, different individual zones 32 of conveyor rollers 26 can be actuated to stage articles thereon into motion.

Figure 11:
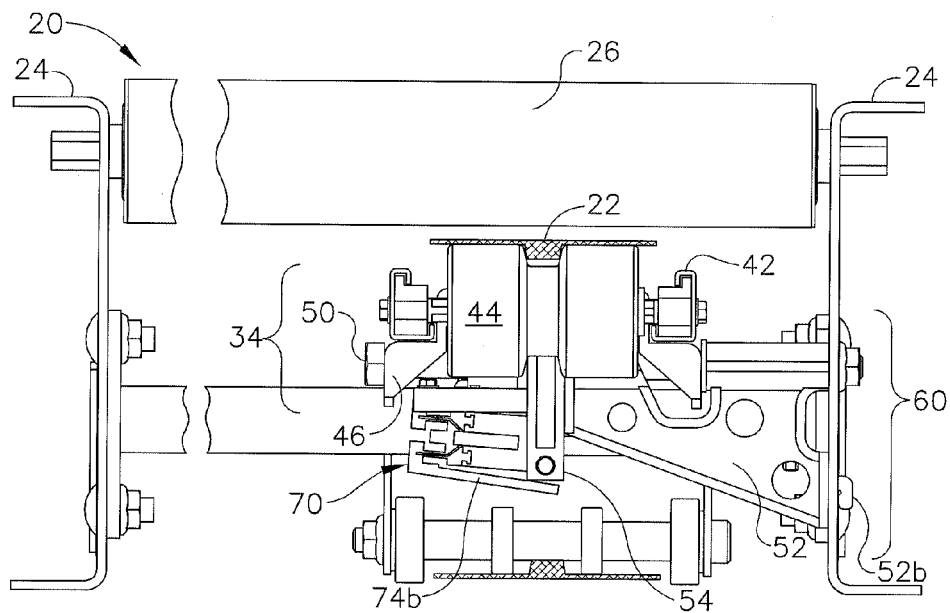
FIG. 11 is an end view of the accumulation conveyor of FIG. 1 with the piezoelectric lift assembly is the un-actuated position.

De-energizing piezoelectric actuator 70 lowers output frame arm 74b, lift pin 56, and lift member 54 back to the lowered position shown in FIGS. 9 and 11. This disengages drive belt 22 from conveyor rollers 26 to stop driving conveyor rollers 26. Wires 72 of more than one piezoelectric actuator 70 can be connected to controller 101 (FIG. 7) that can selectively actuate any piezoelectric actuator 70 or groups of actuators 70 in any sequence necessary to activate or de-activate any group of conveyor rollers 26 in any individually controllable zone 32.

It is believed that piezoelectric actuators 70 have a rapid response time that is quicker than motors or fluid powered devices, and can be held actuated for long periods of time with low power consumption. It is also believed that the rapid response time and quiet operation of piezoelectric actuators 70 can be conducive to more precise timing, more rapid movement of articles, higher conveying speeds, and increased article throughput.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments are explained in detail, it is to be understood that the invention is not limited in its scope to the details of construction and arrangement of components set forth in the preceding description or illustrated in the drawings. The invention is capable of being practiced or carried out in various ways. Also, specific terminology had been used for the sake of clarity. To the extent that the term "includes" is used in either the detailed description or the claims, such term is intended to be inclusive in a manner similar to the term "comprising" as "comprising" is interpreted when employed as a transitional word in a claim. It is to be understood that each specific term includes all technical equivalents which operate in a similar manner to accomplish a similar purpose.

What is claimed is:

1. An accumulation conveyor for transporting articles, said accumulation conveyor comprising:
    a plurality of rollers defining a conveying surface;
    a frame supporting the plurality of rollers, wherein the rollers are rotatable relative to the frame;
    a drive belt electively couplable with the plurality of rollers to drive the plurality of rollers; and
    an actuator assembly comprising at least one piezoelectric actuator for multiplying output motion of a piezoelectric element thereof, the at least one piezoelectric actuator having an output arm movable relative to the piezoelectric actuator and the actuator assembly having a lift member coupled with the output arm, the actuator assembly configured to selectively urge the drive belt into driving engagement with the plurality of rollers.

2. The accumulation conveyor of claim 1, wherein the plurality of rollers comprise a plurality of individual zones, wherein the actuator assembly is configured to selectively urge the drive belt into driving engagement with a selected zone of the plurality of individual zones.

3. The accumulation conveyor of claim 1, wherein the lift member is coupled with the output arm via a lift pin.

4. The accumulation conveyor of claim 1, wherein the actuator assembly comprises a plurality of pressure rollers, and the at least one piezoelectric actuator is operable to urge the plurality of pressure rollers against an upper run of the drive belt so as to urge the drive belt into driving engagement with the plurality of rollers.

5. The accumulation conveyor of claim 4, wherein the plurality of pressure rollers are supported by an actuator frame.

6. The accumulation conveyor of claim 1, wherein when the piezoelectric actuator assembly is energized, the drive belt is urged into driving engagement with the plurality of rollers.

7. The accumulation conveyor of claim 1, wherein when the piezoelectric actuator assembly is de-energized, the drive belt is not urged into driving engagement with the plurality of rollers.

8. The accumulation conveyor of claim 1 further comprising a controller to selectively actuate the piezoelectric actuator assembly.

9. The accumulation conveyor of claim 1, wherein at least a portion of the actuator assembly moves linearly to urge the drive belt into driving engagement with the plurality of rollers.

10. The accumulation conveyor of claim 1, wherein at least a poltion of the piezoelectric actuator moves in an arcuate path so as to urge the drive belt into driving engagement with the plurality of rollers.

11. An accumulation conveyor for transporting articles, said accumulation conveyor comprising:
  a plurality of rollers defining a conveying surface;
  a frame supporting the plurality of rollers, wherein the rollers are rotatable relative to the frame;
  a drive belt selectively couplable with the plurality of rollers to drive the plurality of rollers; and
  an actuator assembly comprising at least one piezoelectric actuator for multiplying output motion of a piezoelectric element thereof, the actuator assembly configured to selectively urge the drive belt into driving engagement with the plurality of rollers, wherein the actuator assembly comprises at least one support bracket, and the at least one piezoelectric actuator is mounted to the at least one support bracket, and the actuator assembly further comprises at least one lift member carried by a respective support bracket of the at least one support bracket, the at least one lift member comprising at least one guide arm, the respective support bracket defining a respective guide configured to receive the at least one guide arm.

12. An actuation assembly for an accumulation conveyor, the actuation assembly comprising:
  a support bracket;
  a lift member translatable relative to the support bracket; and
  at least one piezoelectric actuator coupled with the support bracket, wherein the piezoelectric actuator comprises an output arm movable relative to the support bracket, wherein the output arm is coupled with the lift member such that the piezoelectric actuator is configured to move the lift member relative to the support bracket; wherein the actuation assembly is configured to selectively urge a drive belt into driving engagement with a plurality of rollers of the accumulation conveyor.

13. The actuation assembly of claim 12, wherein the piezoelectric actuator comprises a piezoelectric element configured to change shape in response to an electrical charge.

14. The actuation assembly of claim 13, wherein the piezoelectric element is configured to linearly extend in response to the electrical charge.

15. The actuation assembly of claim 13, wherein the piezoelectric element is configured to return to an original shape after application of the electrical charge to the piezoelectric element is stopped.

* * * * *